United States Patent [19]
Botsolas

[11] Patent Number: 5,620,551
[45] Date of Patent: Apr. 15, 1997

[54] CORNER EDGE ROLL

[75] Inventor: Chris J. Botsolas, Clearwater, Fla.

[73] Assignee: Carol M. Botsolas, Clearwater, Fla.

[21] Appl. No.: 417,655

[22] Filed: Apr. 5, 1995

Related U.S. Application Data

[62] Division of Ser. No. 320,601, Oct. 11, 1994, which is a continuation of Ser. No. 147,872, Nov. 4, 1993, abandoned, which is a division of Ser. No. 776,199, Oct. 15, 1991, Pat. No. 5,281,456.

[51] Int. Cl.[6] .............................. B32B 7/02; D04H 1/58
[52] U.S. Cl. ........................ 156/257; 156/212; 156/216; 156/289
[58] Field of Search ............................ 428/40, 41, 42, 428/43, 906; 156/204, 212, 216, 227, 268, 251, 252, 257, 258

[56] References Cited

U.S. PATENT DOCUMENTS

| 276,044 | 4/1883 | Holt . | |
|---|---|---|---|
| 2,545,030 | 3/1951 | Isenberg et al. | 154/44 |
| 2,695,254 | 11/1954 | Isenberg | 154/44 |
| 3,307,590 | 3/1967 | Carlson | 138/149 |
| 3,492,029 | 1/1970 | French et al. | 285/47 |
| 3,559,660 | 2/1971 | Rollins | 138/149 |
| 3,981,689 | 9/1976 | Trelease | 29/183 |
| 4,263,355 | 4/1981 | Sarkisian | 428/124 |
| 4,477,108 | 10/1984 | Castelbaum et al. | 285/149 |
| 4,522,578 | 6/1985 | Martin, Jr. et al. | 425/110 |
| 4,572,553 | 2/1986 | Geldner | 285/363 |
| 4,854,610 | 8/1989 | Kwiatek . | |
| 4,869,293 | 9/1989 | Botsolas | 138/96 |
| 5,014,752 | 5/1991 | Takenakajima et al. | 138/149 |
| 5,030,504 | 7/1991 | Botsolas et al. | 428/215 |
| 5,281,456 | 1/1994 | Botsolas | 428/40 |

FOREIGN PATENT DOCUMENTS

| 2756935 | 7/1978 | Denmark . |
| 2461192 | 7/1979 | France . |
| 54-16768 | 2/1979 | Japan . |
| 252198 | 12/1926 | United Kingdom . |

OTHER PUBLICATIONS

Proto LoSMOKE® Oct. 1. 1986 Catalog.
Proto LoSMOKE® Feb. 1. 1989 Catalog.
Murasho, One–Touch Catalog.
Johns–Manville Insulation Systems Catalog.
Speed–Line Mfg. Co. Inc. Zip Jacket Catalog.

*Primary Examiner*—Thurman K. Page
*Assistant Examiner*—Kathryne E. Shelborne
*Attorney, Agent, or Firm*—Hedman, Gibson & Costigan, P.C.

[57] ABSTRACT

The invention relates to a method and an apparatus for forming and applying edging material to the corners of ductwork and other conduit structures.

7 Claims, 2 Drawing Sheets

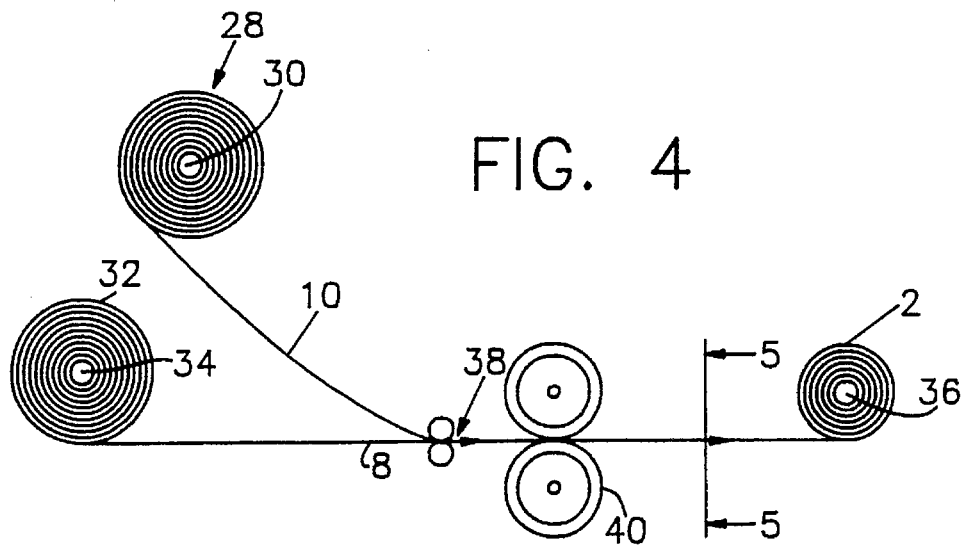
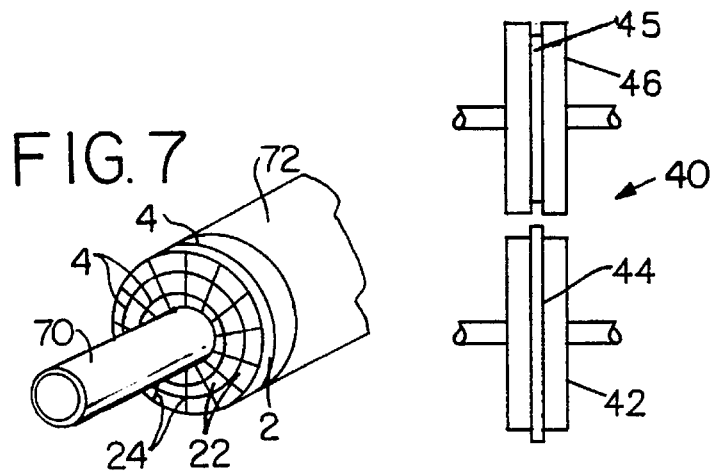
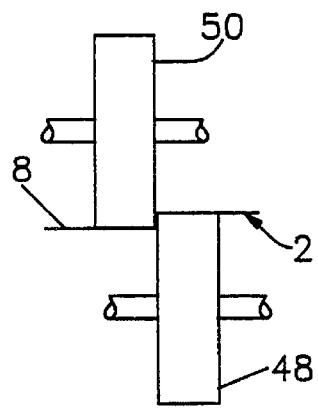

CORNER EDGE ROLL

This is a divisional application of Ser. No. 08/320,601, filed Oct. 11, 1994, which is a file wrapper continuation application of Ser. No. 08/147,872, filed Nov. 4, 1993, now abandoned which is a divisional application of Ser. No. 07/776,199, filed Oct. 15, 1991, now U.S. Pat. No. 5,281,456.

FIELD OF THE INVENTION

This invention relates to insulating ductwork. More specifically, the invention relates to forming lineal corner edging on insulated ductwork and similar structures.

BACKGROUND OF THE INVENTION

It has been the practice in the insulation of heating and air conditioning ductwork to seal the corners of the ducts, whether straight or curved. Typically, ninety degree angle edging made of either sheet metal, plastic or even paper has been used. The insulation industry has traditionally used tin (plated) edges 2"×2" on corners of ductwork, scroll fans and other essentially square edges. These tin plated edges are held in place with tape or contact adhesive which can be brush applied. Thereafter canvas, plastic, or other suitable decorative fabric is stretched around the structure and glued in place. In the case of canvas, further coatings are painted on to shrink the canvas to a tight fit and seal it to provide an attractive finish. Tin edges or galvanized sheet metal are generally made of approximately twenty-four gauge (0.023") thick material.

Murasho Co. Ltd. offers an edging material that is formed in a metal roll consisting of a flat surface with overlapping discrete segments depending from the flat surface at a ninety degree angle. The discrete segments facilitate application of the flat surface on contoured edges. The Murasho product is identified as Roll Kiku-za or squeezed sheet. Similarly, Zeston (Manville Corporation) has marketed a metal end capping product that is essentially the same. A need has arisen for an inexpensive, easy to apply corner edge, starting at 1½"×1½" and going up to 3"×3" to accommodate the normal insulation thicknesses used on ductwork and similar structures that are generally 1" to 2" thick (or more).

SUMMARY OF THE INVENTION

It is an objective of the invention to provide edging material for the corners of ductwork and other conduit structures formed with square or somewhat square corners.

It is another object of the present invention to provide polyvinyl chloride edging for ducting.

It is a further object of the invention to provide a process for manufacturing polyvinyl chloride edging material particularly well suited for sealing the corners of ducting and similar structures.

Accordingly, a flat polyvinyl chloride strip is provided with adhesive on one side, release paper covering the adhesive, and an embossed score line linearly disposed over the length of the strip on the adhesive side. The release paper is severed at the score line to provide two discrete strips of release paper.

Application of the strip to corner edges proceeds by cutting the strip to the length desired, bending the strip down its entire length, on the score line, to a 90° angle, removing one of the two release paper strips, adhering the exposed adhesive portion of the strip to the corner edge. The second strip of release paper is then removed and this portion of the strip is pushed down and adhered in place resulting in a 90° (or other angle desired) straight corner edge that covers and seals any raw edges. Where ducts or equipment that are to be edged, turn away from a straight direction, slits can be scissor cut perpendicular to the length of the strip, up to the score line to form segments that are folded along the score line and adhered to the adjacent surface, on the inside radius curves of the article being edged and to itself.

DESCRIPTION OF THE DRAWINGS

The subject invention will be better understood when viewed with the following drawings wherein:

FIG. 4 is a schematic of the process equipment shown forming the edging material of the subject invention;

FIG. 5 is a sectional view of the embossing roll assembly taken through line 5—5 of FIG. 4;

FIG. 6 is a variation of the process for forming the edging material of the subject invention; and FIG. 7 is the edging material of FIG. 1 applied to an insulated pipe.

DESCRIPTION OF THE PREFERRED EMBODIMENT

The invention has application in any environment in which angled corners are required to be sealed. However, the present invention will be described principally in the environment of heating, ventilation and air conditioning ducting.

Figure 1:
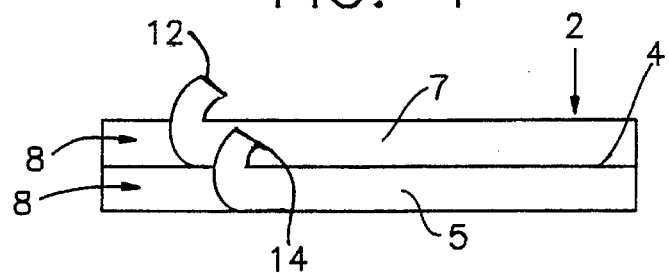
FIG. 1 is a plan view of the edge strip of the present invention.

As best seen in FIG. 1, the present invention is comprised of a flat strip of polyvinyl chloride edging material 2 having a centrally disposed linear score line 4; a layer of adhesive formed on the adhesive side 8 of the strip on which the score line 4 is located and optional separate release paper strips 12 and 14 to maintain the adhesive layer in an unexposed condition until application of the edging material 2 to the edge to be sealed. The score line 4 facilitates the bending of the strip edging material into separate regions 5 and 7.

Figure 2:
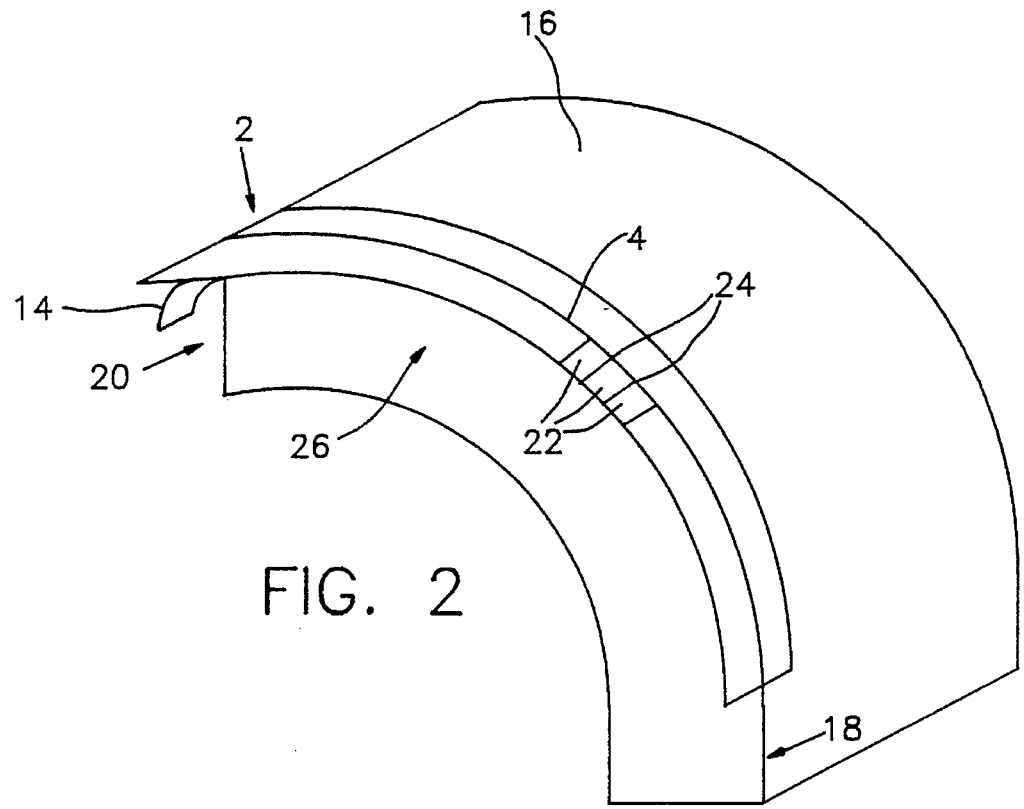
FIG. 2 is a sectional elevational view of the invention applied to one surface of ducting.
Figure 3:
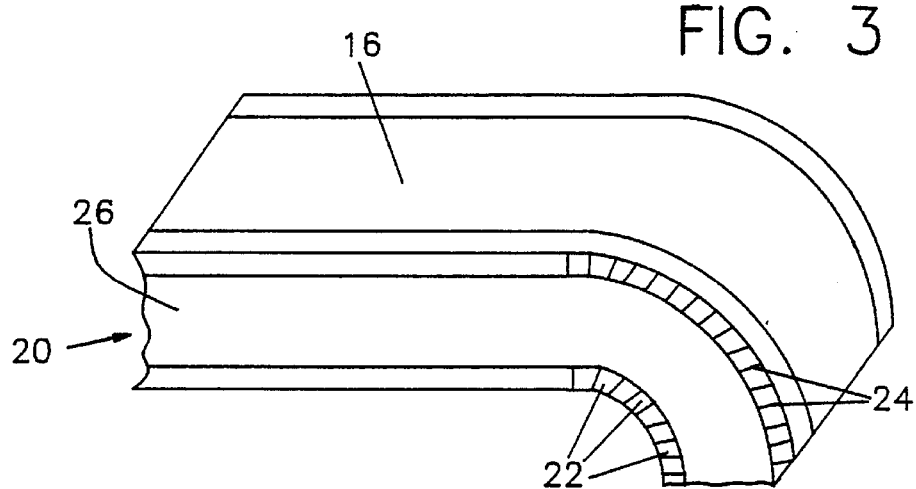
FIG. 3 is the edging material of FIG. 2 shown fully applied to the ducting.

As seen in FIG. 2, the strip is applied to one surface 16 adjacent to the edge 18 being sealed, in this case ducting 20, after removal of a strip of release paper 12. Thereafter, the strip of release paper 14 is removed and the 5 section of the edging material extending beyond the adhered surface is then cut into discrete segments 22 separated by the cut slits 24. The discrete segments 22 are rotated around the score line 4 and the exposed adhesive surfaces of the discrete segments 22 are pressed against the opposite or complementary surface 26 of the ducting 20 to provide a seal at the duct edge 18, best seen in FIG. 3.

The process of forming the edging strip 2 is best seen in FIG. 4 wherein a roll of polyvinyl chloride strip material 28 is formed on an idler mandrel 30, a contact adhesive with silicone paper release tape roll 32 is formed on a separate idler mandrel 34 and the formed edging strip 2 is taken up on a driven mandrel 36. Pressure application rolls 38 are provided to secure the paper release tape to the edging strip and a linear groove adjustable depth embossing roll assembly 40 is provided to form the score line 4.

In operation, the driven mandrel 36 pulls the polyvinyl chloride strip and release paper through the pressure application rolls 38 and the embossing roll assembly 40. The pressure application rolls 38 secure the contact adhesive with silicone paper release strips 32 to the adhesive surface 8 of the polyvinyl chloride strip 2 and the embossing roll assembly 40 forms the score line 4 linearly in a centrally disposed location on the strip 2.

As best seen in FIG. 5, the embossing roll assembly is comprised of an embossing roller 42 with a continuous embossing ridge 44 and a mating roll 46 with a groove 45 corresponding to the embossing ridge 44 against which the embossing ridge 44 reacts through the strip 2 to form the score line 4.

In a variation or modification of the process for forming the corner edge strip 2 of the subject invention, slitting rolls 48 and 50 can be substituted for the embossing roll assembly 40. The slitting rolls 48 and 50, best seen in FIG. 6, are arranged to provide a depth of approximately 0.030 inches when applying the score line 4 to a polyvinyl chloride strip 2. The effect of the slitting roll is to provide both a score line 4 and also sever the release paper into two separate distinct strips 12 and 14, by stretching the polyvinyl chloride strip and tearing the release paper.

The score line 4 on the strip 2, although linearly disposed, can be located off-center. Illustratively, in covering a two inch thick foil faced insulation board, with a four inch corner edge strip 2, a one inch coverage over the foil by the corner edge strip 2 is appropriate with the remaining three inches of the corner edge strip 2 covering the two inches of raw end insulation board and adjacent foil facing. Thus, the strip 2 for that particular application has the linear score line 4 located one inch in from an edge.

Practice has shown that polyvinyl chloride identified as rigid, high impact strength PVC having a thickness of 0.005 inch to 0.0625 inch performs well as the edging strip 2. However, light gauge metal of 0.005 inch to 0.020 inch thickness or more can also serve as the edging material. Further, a composite of aluminum fused to rigid polyvinyl chloride known as VINALUM manufactured by Proto Corporation also performs well as the material of the edging strip 2. The depth of the score line 4 is 0.010 to 0.062 inch and preferably 0.030 inch.

In another embodiment of the invention the corner edging strip may contain a plurality of score lines 4 linearly disposed over the length of the strip 2 which allows for selective forming of the strip to various edges. For example a four inch wide strip may have five score lines, each score line being disposed at least ½ inch from the adjacent score line. The score lines 4 on this embodiment would be located ½, 1, 1½, 2 and 2½ inches from an edge of the strip 2 with the remaining 1½ inches of the strip 2 being unscored. The strip may then be bent at any of the score Lines to form the desired amount of strip material on each side of the article being edged.

The strip 2 with a plurality of score lines 4 is especially suited to edging the terminal ends of insulated pipes.

The terminal end of an insulated pipe is edged by bending the strip 2 at one of the plurality of score lines 4 to create a section of the strip 2 corresponding to the thickness of the insulation on the pipe to be edged. For example, for a pipe 70 covered with 1½ inch insulation, a four inch strip 2 with five score lines at ½ inch intervals would be bent at the score line that is 1½ inches from the edge of the strip 2. The remaining 2½ inch strip is then applied to the outer perimeter of the pipe insulation 72. The 1½ inch portion of the strip 2 is then scissor cut into discrete segments 22 by cutting slits 24 into the strip 2. The discrete segments 22 are then adhered to the exposed terminal end of the pipe insulation with adjacent discrete segments overlapping as seen in FIG. 7.

Once the pipe insulation is edged the edging may be painted with PVC-type adhesive caulkings such as Celulon®, or Clear as made by Red Devil, Inc. of Union, N.J., or All Purpose Adhesive Caulk as made by MacKlanburg Duncan of Oklahoma City, Okla.

The width of strip 2 and number of score lines can be varied to accommodate any pipe insulation thickness or length of lineal pipe covering.

According to this embodiment, one or two rolls of the edging material may be carried by a mechanic to cover the raw ends of pipe coverings rather than ordering specific sized end caps or different roll sizes of the Roll Kiku-za type material.

Many variations of the present invention will suggest themselves to those skilled in the art in light of the above-detailed description. All such obvious modifications are within the full intended scope of the claims.

I claim:

1. A method for forming corner edge material comprised of the steps of:
   (a) forming a layer of adhesive material on one surface of a strip of material; and
   (b) forming more than one score line parallel to the edges of the strip on the side of the adhesive layer wherein the strip is formed of material selected from the group consisting of rigid high impact grade polyvinyl chloride, light gauge metal and aluminum fused to rigid polyvinyl chloride and having a thickness of 0.005 inch to 0.0625 inch.

2. A method as in claim 1, further comprising the step of applying release paper to the adhesive layer surface of the strip.

3. A method as in claim 2, further comprising the step of forming the strip into a roll.

4. A method as in claim 1, wherein the means for forming the score line is an embossing roll.

5. A method as in claim 2, wherein the means for forming the score line and separating the release paper into at least two discrete strips is an array of slitting rollers.

6. A method as in claim 1 wherein the score (lines is) lines are approximately 0.010 to 0.062 inches in depth.

7. A method as in claim 6 wherein the score (line is) lines are approximately 0.030 inches in depth.

\* \* \* \* \*